(12) United States Patent
Malasani

(10) Patent No.: US 8,812,827 B2
(45) Date of Patent: Aug. 19, 2014

(54) WI-FI ROUTER WITH INTEGRATED TOUCH-SCREEN AND ENHANCED SECURITY FEATURES

(71) Applicant: Rammohan Malasani, Taipei (TW)

(72) Inventor: Rammohan Malasani, Taipei (TW)

(*) Notice: Subject to any disclaimer, the term of this patent is extended or adjusted under 35 U.S.C. 154(b) by 0 days.

(21) Appl. No.: 14/040,703

(22) Filed: Sep. 29, 2013

(65) Prior Publication Data

US 2014/0029749 A1 Jan. 30, 2014

Related U.S. Application Data

(62) Division of application No. 13/049,066, filed on Mar. 16, 2011, now Pat. No. 8,555,047.

(51) Int. Cl.

| | |
|---|---|
| G06F 9/00 | (2006.01) |
| G06F 21/00 | (2013.01) |
| G06F 11/30 | (2006.01) |
| H04B 7/00 | (2006.01) |
| H04L 12/28 | (2006.01) |
| H04M 1/66 | (2006.01) |
| G06F 15/177 | (2006.01) |
| G06F 7/04 | (2006.01) |
| H04L 12/24 | (2006.01) |
| H04W 12/04 | (2009.01) |
| H04L 29/06 | (2006.01) |

(52) U.S. Cl.
CPC ............ *H04W 12/04* (2013.01); *H04L 41/0806* (2013.01); *H04L 41/0879* (2013.01); *H04L 63/20* (2013.01)
USPC ............... 713/1; 713/100; 713/184; 713/191; 370/310; 370/351; 455/410; 709/220; 726/21; 726/27

(58) Field of Classification Search
USPC .............. 713/1, 100, 184, 191; 370/310, 351; 455/410; 709/220
See application file for complete search history.

(56) References Cited

U.S. PATENT DOCUMENTS

| | | | |
|---|---|---|---|
| 6,609,197 B1 * | 8/2003 | Ketcham et al. | ............... 713/155 |
| 7,496,754 B2 | 2/2009 | Liu et al. | |
| 7,577,458 B2 | 8/2009 | Lin | |
| 7,675,862 B2 | 3/2010 | Pham et al. | |
| 7,826,463 B2 | 11/2010 | Patel et al. | |
| 8,644,272 B2 * | 2/2014 | Sewall et al. | ................. 370/338 |
| 2008/0172477 A1 | 7/2008 | Mazur et al. | |
| 2009/0103547 A1 | 4/2009 | Lam et al. | |
| 2009/0147700 A1 * | 6/2009 | Sewall et al. | ................. 370/254 |

* cited by examiner

*Primary Examiner* — Stefan Stoynov
(74) *Attorney, Agent, or Firm* — Stephen E. Zweig

(57) ABSTRACT

A Wi-Fi router with an integrated configuration touch-screen, and method to use this integrated touch screen to provide enhanced security features. The Wi-Fi router, which has a wired or optical network interface, may be factory pre-configured with hard to anticipate passwords and encryption codes, thus making even its default Wi-Fi settings difficult to attack. Besides displaying interactive menus on the touch-screen, the router may also generate touch sensitive dynamic alphanumeric virtual keypads to enable administrators to interact with the device without the need of extra computers or software. Inexperienced administrators secure in the knowledge that they may access and change even difficult to remember security settings at any time through the built-in touch-screen controller and simplified user interface, are encouraged to set up secure Wi-Fi systems. The device may optionally include security software that, upon touch of a button, can provide new randomized or otherwise obfuscated router settings.

20 Claims, 12 Drawing Sheets

WI-FI ROUTER WITH INTEGRATED TOUCH-SCREEN AND ENHANCED SECURITY FEATURES

CROSS REFERENCE TO RELATED APPLICATIONS

This application is a divisional application of U.S. patent application Ser. No. 13/049,066, "WI-FI ROUTER WITH INTEGRATED TOUCH-SCREEN AND ENHANCED SECURITY FEATURES", inventor Rammohan Malasani, filed Mar. 16, 2011; the entire contents of which are incorporated herein by reference.

FIELD OF THE INVENTION

This invention relates broadly to wireless networks, and more specifically to security methods for Wi-Fi routers and access points.

BACKGROUND OF THE INVENTION

In recent years, local (e.g. home) Wi-Fi networks have become very popular, and it has been estimated that as of 2011, over 200 million of such Wi-Fi networks have been deployed on a worldwide basis (Parks Associates. "Networks in the Home: Global Growth; A Report for the Wi-Fi Alliance."). These Wi-Fi networks typically consist of a factory pre-configured wireless router, which is often sold in a package consisting of the router, instructions, instillation software, and other accessories such as a power supply and cable. These packages are intended to allow unskilled users to set up the Wi-Fi system. Typically the instructions inform the unskilled user to first install the software on his or her local computer, connect the router (which may be a combination modem and router) to the local wired internet connection (often a wired DSL or cable connection, but alternatively may be a wired Ethernet connection, or even a fiber optic connection to the internet or other network of interest). The user will then interact with the program software to implement the various setup instructions.

Prior art on Wi-Fi router configuration methods and devices include Liu, U.S. Pat. No. 7,496,754; Lin, U.S. Pat. No. 7,577,458; Mazur et. al., US patent application publication 2008/0172477; Lam et. al., US patent application 2009/0103547, and Patel et. al., U.S. Pat. No. 7,826,463.

Although prior art routers were generally designed to be configured only with the aid of an external computer or computerized device, prior art routers generally had some limited built-in display and input capabilities. For example, use of light emitting diodes (LEDs) to show network status, along with use of a few other user input buttons built into the router chassis (e.g. on/off buttons, reset buttons) were known. Pham, in U.S. Pat. No. 7,675,862 taught using a liquid crystal display (LCD) (3110) along with several user input buttons (3130) mounted on the router chassis (3100) to show the connection status for various computer network elements. However such limited input and output methods remained too cumbersome to allow inexperienced users to easily input or change the complex series of alphanumeric data needed to fully configure routers.

Unfortunately, even with the aid of installation software, the average unskilled user finds the process of installing and configuring a router for a Wi-Fi network to be rather intimidating. In order to be easy to configure, the Wi-Fi router will usually be factory pre-configured with a standard Wi-Fi identification (SSID) which is often just the name of the manufacturer, and will usually by factory configured with a standard administrator password such as "admin" or "password". Further all Wi-Fi encryption features are usually factory preset to a disabled configuration. Inexperienced users, who usually simply want to simply click "yes" to a number of default installation questions and setup parameters, often don't enable these security features. Once the Wi-Fi network is up and running, the user will then most likely discard the installation software and instructions, and never want to interact with the Wi-Fi router again.

As a result, at present the security of such "home" Wi-Fi networks is very low, and many of these Wi-Fi networks allow an outside attacker to access the Wi-Fi network, and the contents of the various computers attached to that Wi-Fi network, with little or no effort. For example, in 2010, Eric Schmidt, then CEO of Google, admitted that the company's cars that had been capturing images of local buildings for the Google Street View mapping application had also captured data on millions of local Wi-Fi networks, including samples of non-password protected payload data.

Unfortunately, it is also common knowledge that many local Wi-Fi networks are unsecured, and a recent poll showed that about 32 percent of all respondents admitted that they had tried to access a Wi-Fi network that wasn't theirs.

An additional problem with present Wi-Fi network installation procedures is that even the simple process of accepting all the default settings, and producing an unsecure Wi-Fi network, is often too complex for many unskilled users. As a result, many perfectly good Wi-Fi units are returned to the store, distributor, or manufacturer with a demand for a refund, causing unnecessary hassles and expense for users, stores, distributors, and manufacturers alike.

SUMMARY OF THE INVENTION

The invention is based, in part, on the insight that in order to help address this problem of unsecured Wi-Fi networks, the standard process of configuring a Wi-Fi router must be significantly changed. In particular, the practice of factory pre-configuring Wi-Fi routers with standard SSID identifications and administrator passwords, and with the encryption features set to disabled, must be stopped. However attempting to do this with the present Wi-Fi router designs, with installation procedures that require the use of outside computers and software, would rapidly lead to chaos.

The invention is also based, in part, upon the insight that with prior art Wi-Fi routers, a user must first establish communication with the Wi-Fi router from some other computerized device, such as a home PC, laptop, or tablet computer. Establishing these communication parameters often requires that the unskilled user not only establish a basic network connection with the Wi-Fi router, which is daunting enough, but then also requires that the user know the proper passwords and authentication codes by which to inform the Wi-Fi router that the user is, in fact, authorized to make configuration changes in the Wi-Fi router.

In a further insight, the invention contemplates the possibility that an unskilled user's fear of altering the factory default settings may, in fact, be at least partially justified or at least reasonable. In particular, unskilled users may reasonably believe that if he or she somehow changes the passwords or authorization codes away from the factory default setting, and then forgets the new settings, that router may then be rendered subsequently unfit to use.

The invention is also based in part, on the insight that the way to improve security on Wi-Fi networks is to modify the router itself so that an unskilled user, without an external computer, and without external software or connections, can nonetheless easily configure the device to a secure setting at the time of initial installation, as well as any later time. If the unskilled user is assured that even if the router is mis-configured, or the new passwords and encryption codes forgotten, the router can still be easily reconfigured to a proper setting, then the unskilled user will be much more likely to properly configure the router on initial setup. Thus in order to encourage unskilled users to properly configure their Wi-Fi routers, the Wi-Fi router design itself must be such that the unskilled user may always have assurance that they can regain control over their router regardless of how badly it may have been mis-configured.

Here, prior art on routers with built-in display screens, such as the previously discussed devices of Lin (U.S. Pat. No. 7,577,458) do not go far enough. Lin taught a router with a built-in LCD screen that would display information potentially useful to sophisticated users, such as information about unauthorized users, number of users, and user identifiers, that may indeed be useful once the Wi-Fi network is established, but which is relatively useless in securely configuring a new Wi-Fi network.

What is needed is a Wi-Fi router with a more comprehensive, built in, graphical user interface that is capable of both providing installation instructions and configuration options suitable for unskilled users to easily understand, and an ability to accept a variety of different types of input. Here prior art router input designs, which were typically limited to a few buttons or keys at most, were too limited. Rather, to implement a full-featured graphical user interface, the user must, as needs dictate, be able to type on virtual keypads or keyboards, select among various icons and graphical options, and in general interact with the router in a fluent and natural manner.

In one embodiment, the invention may be a wireless Wi-Fi router, with a wired or optical network interface, an integrated touch screen, and a wireless Wi-Fi output. Unlike prior art routers that use wired or optical network interfaces, this router will have an integral touch-screen, generally disposed on the surface of the router, along with an appropriate graphical user interface control microprocessor and configuration software. This configuration software will generally contain a simplified user interface so that an unskilled user, either by direct finger touch or by stylus, may easily reconfigure the status of the router at any time.

In an alternative embodiment, the invention may be a method of factory configuring a wireless Wi-Fi router. This router will again generally comprise a wired or optical network interface, an integrated touch screen, and a wireless Wi-Fi output. The router will also have at least one Wi-Fi encryption type and encryption code key, an administrator password, and an SSID network name. This factory configuration method may comprise factory configuring each individual factory manufactured router with an encryption code key and an administrator password with factory default values that are unique to each individual router. As a result, when this wireless Wi-Fi router is at least initially installed into a network, the default encryption code key and default administrator password cannot be predicted by an outside attacker. In order to make the router simple enough for unskilled user or administrator to configure, the administrator of the router may then further configure the router by direct touch or stylus input onto an integrated router control touch screen, without the need to use a different computerized device or external configuration software.

BRIEF DESCRIPTIONS OF THE DRAWINGS

DETAILED DESCRIPTION OF THE INVENTION

As previously discussed, the present invention is based, in part, upon the observation that the security of a Wi-Fi router can be substantially improved by avoiding the prior art convention of using a uniform default factory setting. If the default factory setting is difficult to predict, then the average router will have a unique or semi-unique set of parameters that will be difficult for an attacker to penetrate. Further, the invention is based, in part, on the observation that in order to be able to make such a non-predictable factory default setting process workable for large numbers of unskilled users, an improved Wi-Fi router with an integrated touch-screen panel and easy to configure software is also needed. Such an improved Wi-Fi router could then be easily configured without the need to communicate with an external PC or laptop configuration device.

LIST OF DEFINITIONS

1) Wi-Fi®—Typically used interchangeably with IEEE Std 802.11. The trademark is owned by the Wi-Fi Alliance.

2) WEP—Wired Equivalent Privacy, Original encryption standard used in Wi-Fi networks. This encryption is used to transmit data over the air between the various devices forming the Wi-Fi network.

3) WPA—Wi-Fi Protected Access, an upgrade encryption standard that provides better security than WEP.

4) WPA2—An improvement on the WPA, with even better encryption.

5) SSID—Service set identifier, is a name that identifies a particular 802.11 wireless LAN.

6) WPS—Wi-Fi Protected Setup is a standard for easy and secure establishment of a wireless home network.

7) Encryption Key—The code used to access a secure & encrypted Wi-Fi network. The encryption used could be one of the many standards supported the Wi-Fi protocol such as WEP, WPA, WPA2, etc.

8) Public Wi-Fi Network—A loosely used term that typically refers either to a Wi-Fi network that transmits over the air without any encryption or a Wi-Fi network at a public place such as McDonalds, airports, coffee shops, and so on.

9) Unsecured Wi-Fi Network—Typically refers to a Wi-Fi network that transmits data over the air without any encryption.

10) Private Wi-Fi Network—Typically refers to a Wi-Fi network that is inaccessible without an encryption key for this network.

11) Wi-Fi Router—Typically refers to a single device that has a built-in Wi-Fi access point and an Ethernet switch.

12) Wi-Fi Access Point (AP)—Only a Wi-Fi Access point without a switch.

Figure 1:
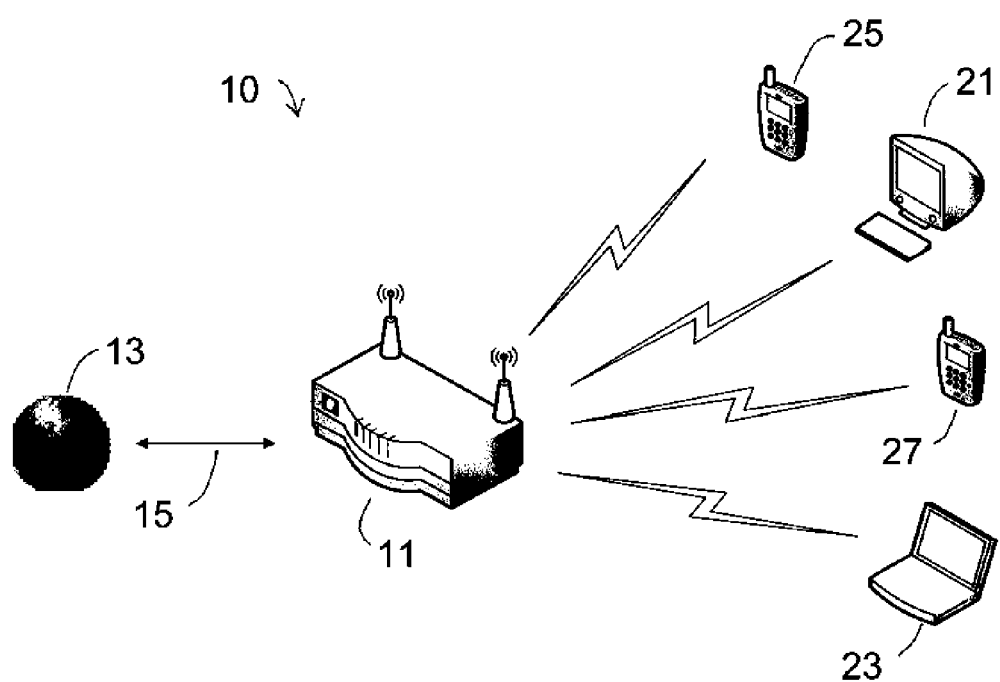
FIG. 1 is an isometric diagrammatical illustration of a wireless network, in accordance with the present state of the art.

A conventional wireless fidelity (Wi-Fi) network (10), shown in FIG. 1, may include a Wi-Fi router (11) operating in accordance with IEEE Standard 802.11. The router (11) typically includes a built-in Wi-Fi access point and at least one Ethernet switch. The router (11) is typically connected to the Internet (13) or other network via a physical (wire or optical fiber) digital subscriber line (DSL) cable modem, optical fiber (15), or other Internet delivery technology and provides a greater level of convenience for a user than would a corresponding wired network (not shown).

Once the Wi-Fi network (10) has been properly set up and configured, the user is free to locate one or more of a desktop computer (21) with a built-in or external Wi-Fi card (not shown), a laptop computer (23) with a built-in or an external Wi-Fi card (not shown), or other wireless devices (25), (27) essentially anywhere within the coverage area of the Wi-Fi network (10). This configuration allows the user to transfer data, audio and video files, for example, without being encumbered by network Ethernet connections. Thus, installation of the wireless network eliminates the need for the expensive network cabling for an Ethernet LAN.

However, unlike wired transmissions, wireless transmissions are not physically bounded. Rather they can travel for hundreds or even thousands of feet beyond the walls of the user's building. Thus an unscrupulous individual can use electronic surveillance equipment or even just another wireless computer to capture the user's transmissions, and obtain access to the user's information and computers.

A typical Wi-Fi access point or router is configured to allow an administrator to manage the Wi-Fi network through a special administrative account. An administrative account may provide complete, "super-user" access to the configuration utilities in the router (11) via a special username and password. In the present state of the art, both the account username and password for a conventional router are set at the factory by the manufacturer. The username is often simply the term 'admin' or 'administrator.' The password is typically empty (i.e., a blank field), or a simple term such as 'admin,' 'public,' or 'password.'

Moreover, the default passwords for popular models of wireless network gear are well-known to hackers, and are easily found on the Internet. From a security standpoint, the user of a Wi-Fi network would be well-advised to improve the security of the newly-installed network by changing the simple, factory-set administrative password in the router to a strong password immediately upon initial installation. Even better, the user should also change the administrative username, however as previously discussed, often this doesn't happen.

Besides the administrator account described above, Wi-Fi routers also provide various kinds of encryptions for the data being transmitted and received "over the air." These encryption methods have a key or passkey (that is different from the above administrator password). Most state of the art wireless routers give users the option of leaving their Wi-Fi network unencrypted or the ability to use one of the many supported encryption standards. Again, however, far too often this encryption method is turned off, rendering the transmissions easy to read by unskilled attackers using standard computer equipment.

The present invention addresses the above problems by providing to the user an easy to configure router, with a built-in touch screen often displaying a graphical user interface with simple setup instructions, which also have a difficult to guess or hack set of security settings. These security settings can include a difficult to guess password, encryption key, and optionally an automatic method of setting the router to a secure setting.

Figure 2:
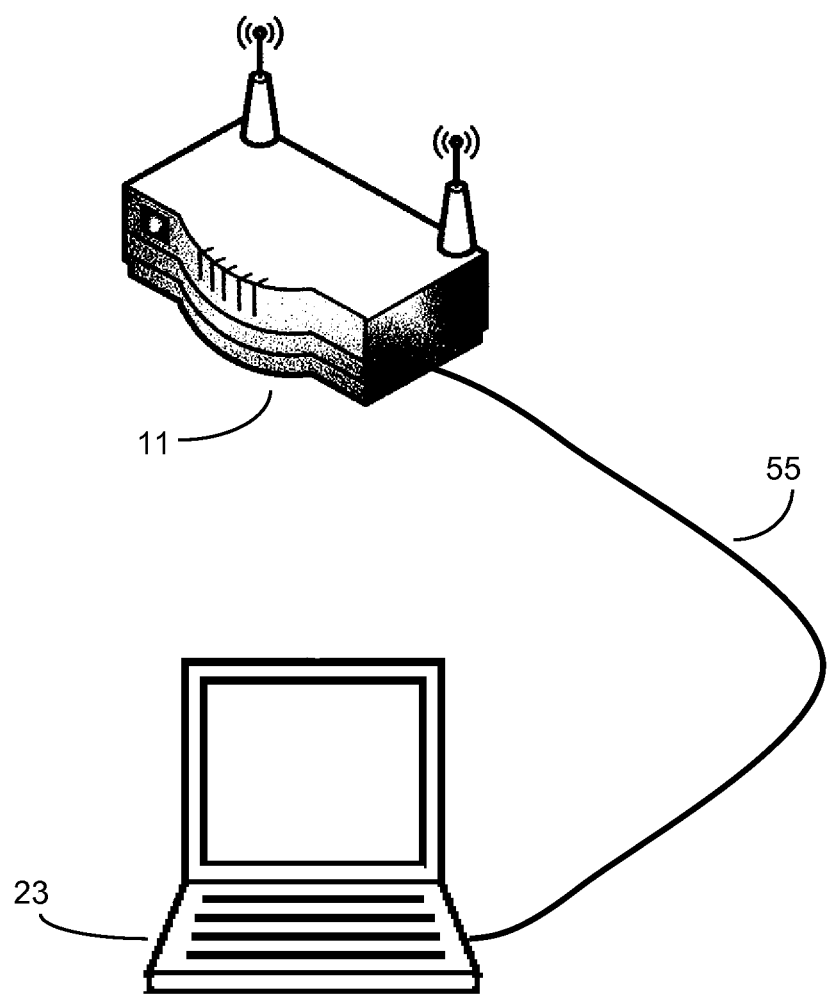
FIG. 2 is a functional block diagram of a computer attached to a conventional wireless router for configuration, in accordance with the present state of the art.

FIG. 2 shows how a prior art wireless router (10) can be configured in accordance with IEEE Standard 802.11. In the present state of the art, such Wi-Fi routers are usually factory configured and shipped with no default security (i.e. the default security options are turned off). The users, who are often quite inexperienced, thus need to manually enable various router security functions when the device is turned on for the first time. Generally, with prior art devices, the user initiates security configuration by first attaching an external computerized device (23) that is running a web browser, and logging into the router's administrative console (not shown) through this web browser, using the router's current (factory default) password and username. In the example provided, the router (11) may have a fixed default login and a pre-established password for an administrative account in the program memory module. Then, the user needs to use an external computerized device (23), often connected to the prior art router (11) by a wired Ethernet cable (55) to navigate to the appropriate administration or security section where the password setting and other setup parameters can be changed.

Figure 3:
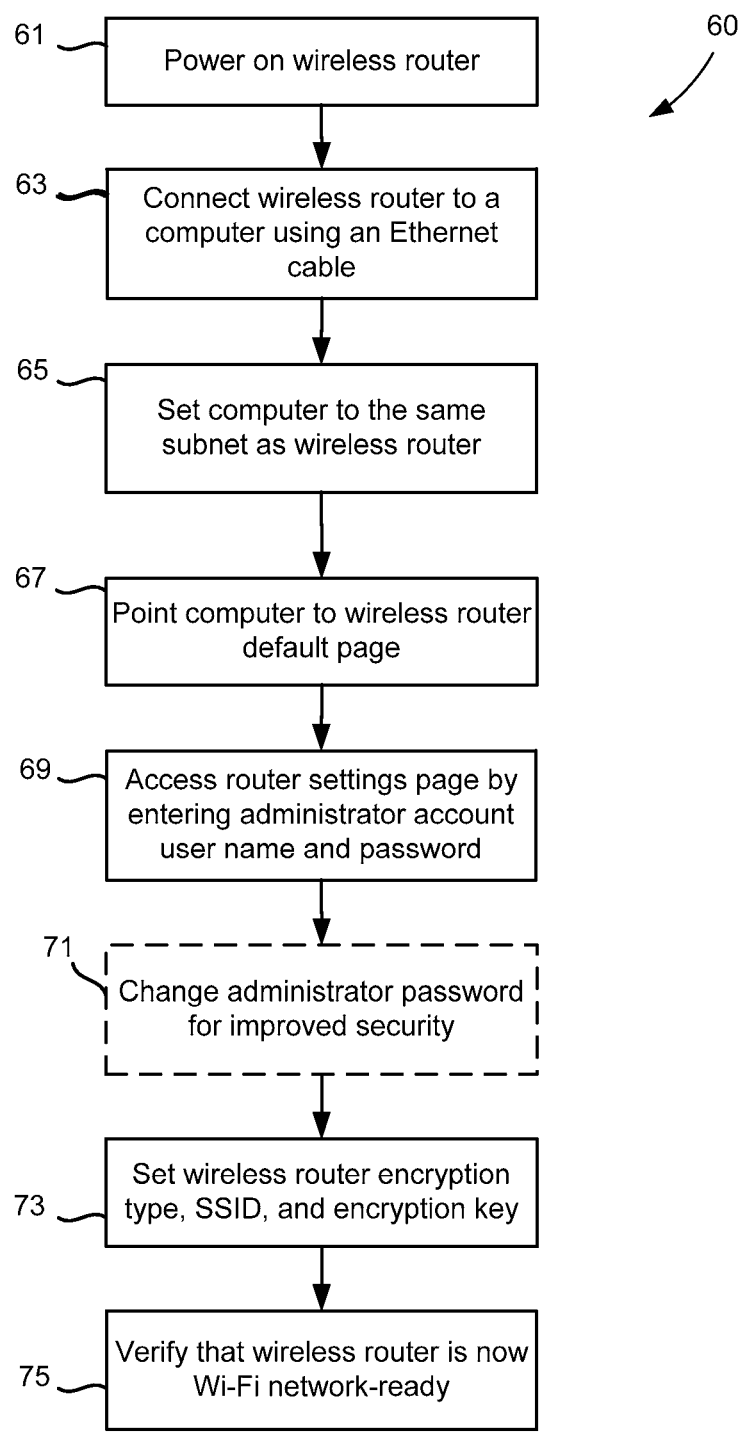
FIG. 3 is a flow diagram of the process followed by a user of the computer of FIG. 2 when initially setting up a wireless network with the conventional wireless router.

Thus using prior art configuration methods, the router password can be changed by following the "out of box" setup instructions similar to that shown in FIG. 3, flow diagram 60. These setup instructions typically instruct the user to power on the wireless router (10) at step (61), and connect the router to an external computer (23) via an Ethernet cable (55) at step (63). This external computer (23) must generally be set to the same subnet as the wireless router (30), at step (65). A typical subnet address is a multiple digit series of numbers such as "192.168.1.x" The user opens a web browser running on the external computer (23), and directs this web browser to the default page (IP address) of the wireless router (10), at step (67). A typical default page may have the IP address "192.168.1.1".

The user may then reconfigure the various operating parameters for router (11) by using his or her external computer (23) to enter an administrator account user name and the correct password, at step (69), thus allowing access to a configuration page. In theory, at this point, step (71), the user should elect to change the administrative password, for better security. Ideally a suitable password, specified by the user, may be based on the standard guidelines for strong password security. In practice, many inexperienced users, terrified that if they forget this password, the device will become useless, instead often continue to select the factory default password (often "admin" or "password").

Inexperienced users often forget to configure other important security steps as well. For example, many Wi-Fi routers ship with a feature known as MAC address filtering, which is normally "turned off" by the manufacturer before shipment. Ideally a user should also enable MAC address filtering to improve the security of a Wi-Fi LAN, but again often this doesn't occur.

Still later, at another frequently skipped step (73) the user can set the router encryption type and the encryption key. After completion of this step, the user should in theory verify that the wireless router (10) is Wi-Fi network ready, and continue on. In practice, many inexperienced users, who may never have even able to establish communication with the router using their external computer (23) in the first place will have by this time rendered their router useless or have given up altogether.

Manufacturers often produce routers with a variety of different Wi-Fi encryption algorithms including wired equivalent privacy (WEP) or Wi-Fi Protected Access (WPA or WPA2) to improve security. WEP, WPA and WPA2 are encryption standards, chosen by the IEEE 802.11 standards committee, to scramble or encrypt network traffic mathematically. WPA provides stronger encryption than WEP and WPA2 provides even stronger encryption than WPA. As WEP, WPA and WPA2 are features that can be turned "on" or "off" in the router (11), the user should ideally also ensure that either WEP or WPA is properly configured when the wireless network is set up. In practice, this also doesn't happen, leaving the Wi-Fi network wide-open for anyone to come by and snoop on the system.

Figure 4:
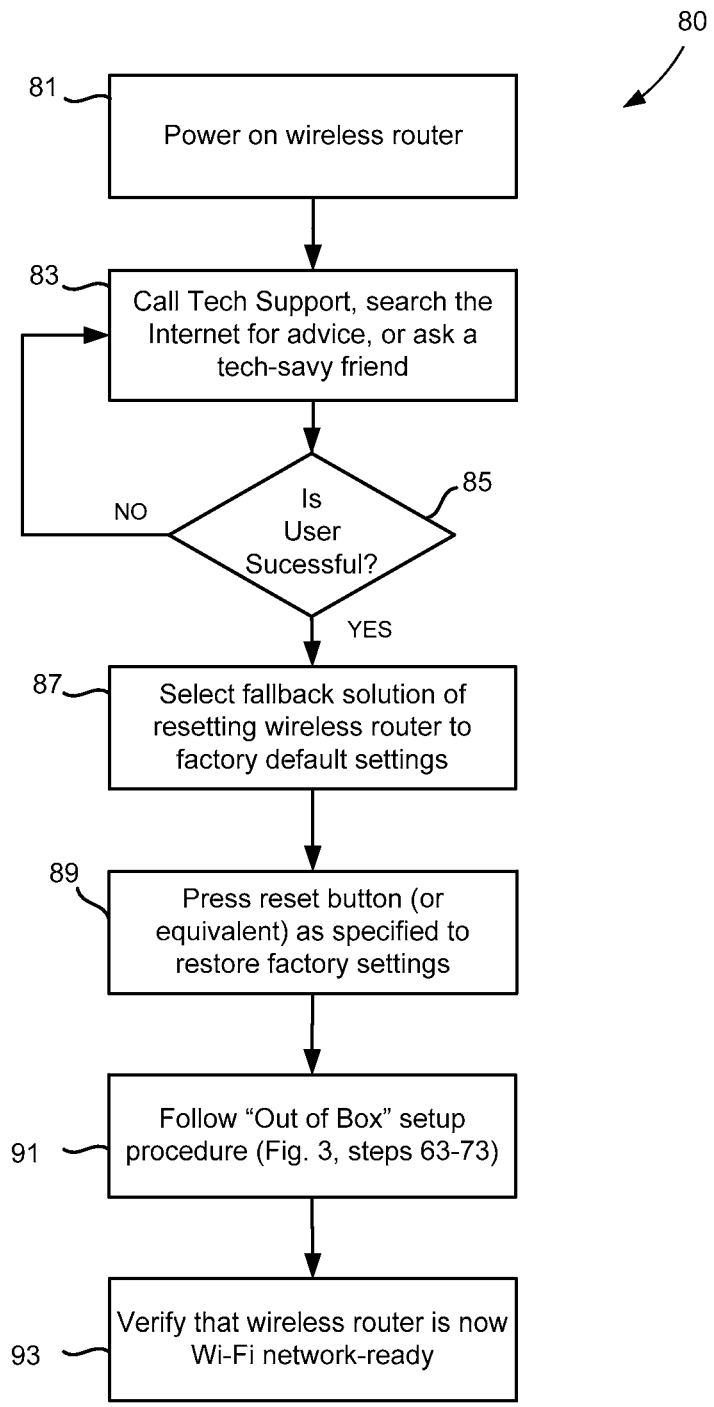
FIG. 4 is a flow diagram of the process followed by a user of the computer of FIG. 2 when subsequently re-setting up the wireless network after the user has forgotten or misplaced the encryption key, or has lost the original router documentation.

As can be appreciated, this is not a simple procedure for the average user, and consequently, such users may not be motivated to make the necessary security changes to their router and wireless network. Moreover, if the user forgets their administrative password, or no longer has the original documentation that was provided with the wireless router (11), the process of restoring the wireless network to a secure state is not very easy. As illustrated in FIG. 4, block diagram 80, after a user has powered up the unsecure router (11), at step (81), it usually becomes necessary to call either technical support for the router (11), or to search the Internet for advice, or contact a technically-savvy friend (83). If one such information source is not satisfactory to the user, at decision block (85), it could be a frustrating experience for the end user and leave the user with a router that can no longer be used effectively.

If the user is successful in obtaining information, the next step taken is usually to select the option of resetting the wireless router (11) to the factory default settings, at step (87). This may be accomplished by depressing a reset button, or equivalent, on the router (11) to restore the factory settings, at step (89). If the reset action is successful, the user may proceed to follow steps (63) through step (73) of the flow diagram (60), to step (91) of the flow diagram (80). The wireless router (11) is verified to be Wi-Fi network ready, at step (93).

Although certain automated wizards may be provided to somewhat simplify this task, these automated wizards also run on external computers (23), and the software to run them is frequently out of date or deleted.

Improved Routers with Built-in Touch Sensitive Display Screens.

Figure 5:
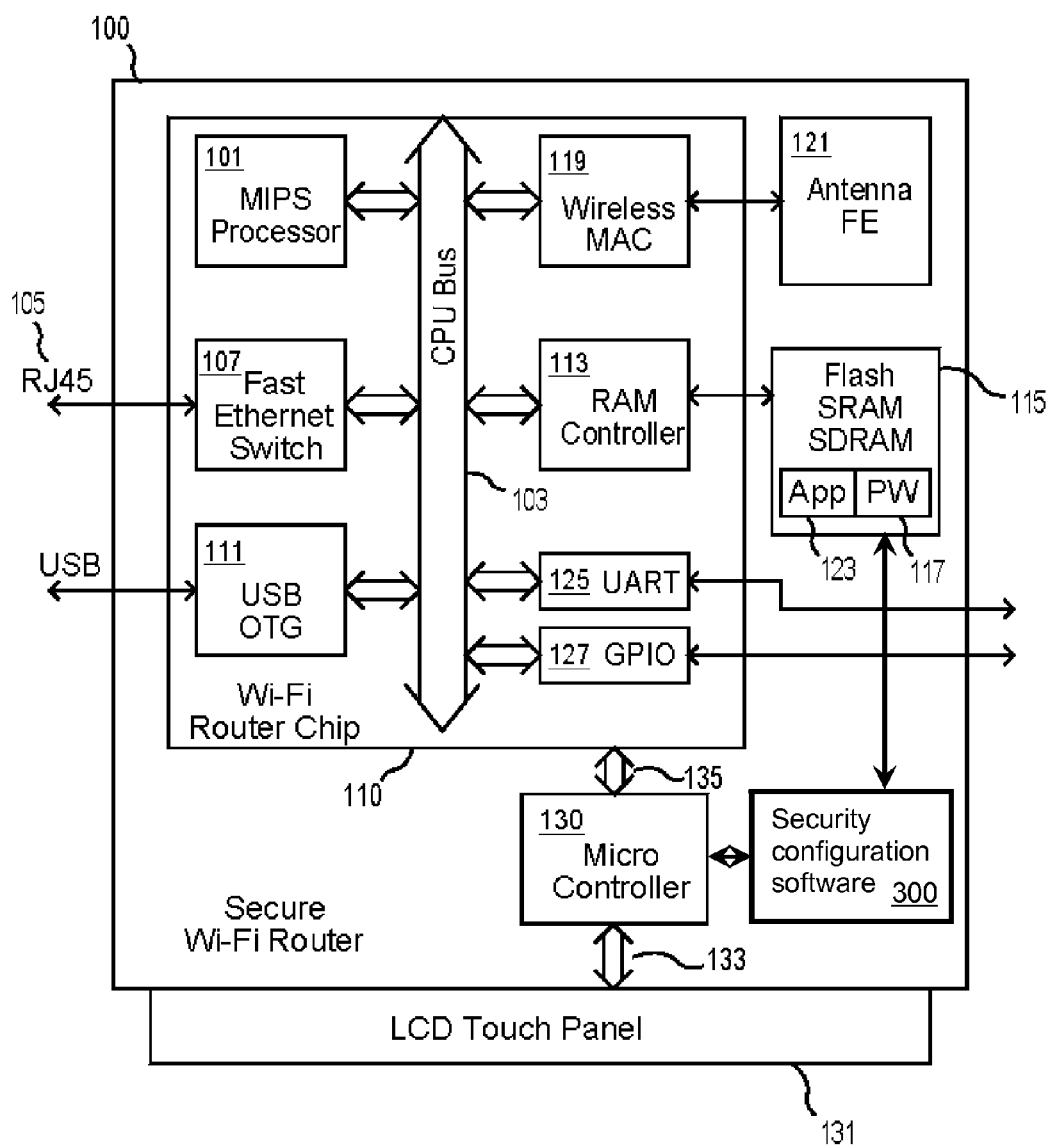
FIG. 5 is a functional block diagram of an exemplary embodiment of a secure Wi-Fi router, in accordance with an aspect of the present invention.

As previously discussed, the invention's improved router devices and router configuration methods are based upon an improved router design that uses a built-in touch-sensitive display screen to simplify many aspects of the router configuration process, particularly for unskilled users. A diagram of one embodiment of such a router with a built-in touch sensitive display screen is shown in FIG. 5.

Most of the innovation in the present invention is focused on the router's built-in touch sensitive display screen, user interface, security software, and factory configuration methods. However for the sake of completeness, the other elements of the router will also be described.

In one embodiment, such a router (100) with a built-in, touch sensitive, display screen (131) may be fabricated using a commercially available Wi-Fi router system-on-a-chip (SoC) device (110), such as the RT3052 AP/router SOC available from Ralink Technology Corp., Cupertino, Calif. Many other Wi-Fi electronics devices may, of course, also be used, such as a combination of the AR7240 Processor and the AR9285 MAC/Baseband/Radio (both available from Atheros Communications, San Jose, Calif.) or other Wi-Fi electronics. The Wi-Fi router (100) may include a processor such as a MIPS processor (101) (or other processor design, but here MIPS processors operating in accordance with a MIPS instruction set architecture will be used as a specific example). In an exemplary embodiment, the MIPS processor (101) may have a clock rate of about 384 MHz, and functions to provide control to the router (100) via a 128 MHz CPU bus (103). Other processor types, clock rates, and processor or communication methods and buses may also be used.

The Wi-Fi router (100) may provide conventional wired output to an RJ45 port (105) via a fast Ethernet switch (107) on the CPU bus (103), and to an optional USB port (not shown), via a universal serial bus on the go (USB OTG) module (111) or other device. Operation of the Ethernet switch (107) and the USB OTG module (111) may be controlled by the MIPS processor (101) via the CPU bus (103). This router may use a wireless LAN network media access controller (MAC) device to provide packet transmission to the user via an RF front end and antenna module. This router may also support a universal asynchronous receiver/transmitter (UART) interface to enable serial communication with a serial console port.

In some embodiments, the MIPS processor, the UART module, the USB module, MAC, and fast Ethernet Switch, part of the Front End and the RAM controller may be provided on a single router chip, and such router chips may be used to provide at least a component of the present invention as well.

The Wi-Fi router (100) may also include a RAM controller (113) for providing access to a memory module (115). In an exemplary embodiment, the memory module (115) comprises a flash memory, a static random access memory (SRAM), or a synchronous dynamic random access memory (SDRAM).

Although in prior art routers were generally configured with memory modules that contained the same factory preset passwords and other factory default information, according to the invention, this standard practice may be modified or abandoned. Rather, the factory will generally have equipment capable of assigning unique passwords, security codes, and other critical setup information that is generally different between different routers, and designed so that it will be difficult for an attacker, even knowing the manufacturer name and model number of the modem, to guess or anticipate.

These "hard to anticipate" factory assigned passwords and security codes need not be totally random, although they may be. The goal is simply to be difficult to guess. Thus even sub-optimal passwords, such as those produced by a random combination of two shorter common words, may be used in this factory configuration process, and this will still be a great improvement over the prior use of uniform passwords. Alternatively totally random passwords and other encryption codes may be used.

Thus the invention router's memory module (115) will generally include a default (factory preset) password designed to be difficult for an attacker to anticipate. Using a randomly generated password as a specific example, this factory preset unique, randomly generated login, password (117) can be either printed on a label that can be attached to the outside of the router, and digitally stored in the memory of memory module (115) during a manufacturing step in the fabrication of the Wi-Fi router (100). This way when the router is first turned on, it can retrieve these hard to anticipate passwords and encryption algorithms, and start up in a secure configuration from the moment that the device is first powered on.

As previously discussed, the invention's router will additionally contain a touch-sensitive display screen (131), capable of directly showing the router's settings and other easy to use configuration options, that can be directly accessed by the user without the use of any additional outside computer or software. This display will help reassure the user that it is safe to enter in even difficult to remember passwords and encryption settings, because the user will know that at the touch of a button, the router will display these options to the user. The electronics and software behind this touch sensitive display will be discussed in more detail shortly.

In general, most Wi-Fi routers are kept in a secure environment where a user has an expectation of privacy. In these situations, the router's built-in, touch-sensitive, display screen may at least initially be set to display the router's passwords and encryption settings to any and all individuals who have physical access to the router. Often the factory setting of the invention's router, although making it difficult for outside attackers to gain access through use of hard to predict passwords and encryption codes, may still be very trusting with regards to physical access to the router. This will make it easy for inexperienced users to at least make it difficult for outside attackers to gain access to the Wi-Fi network. However the user interface of the router may also be designed to enable the router administrator to later password protect the router's touch-sensitive display screen as well. Thus, for example, a user who anticipates that the router itself may be accessed by unauthorized individuals may elect to password protect the router's own graphical user interface by either a password or even a biometric sensor such as a fingerprint sensor.

To help guard against inexperienced users who want to override the router's default hard to anticipate security settings with passwords and encryption codes that are too easy to guess, the router control software can be designed to warn against such changes. For example, in some embodiments, the memory module (115) may also store a list of "popular passwords" and logins. A user attempting to use any of the popular passwords in place of the unique, randomly generated, login password (117) will be admonished by the router system software, and be encouraged or even required to use a stronger password. This "too popular" or "easy to anticipate" password list may be remotely updated when the user updates firmware for the Wi-Fi router (100).

Like other Wi-Fi routers, here a wireless LAN network media access controller (MAC) (119), may be used to provide packet transmission to the user, in conformance with IEEE STD 802.11n, via an RF front end and antenna module (121). Note that with the possible exception of the antenna itself, the RF front end is essentially the electronic radio circuitry for a wireless Wi-Fi transceiver.

Operation of the wireless MAC (119) and the RAM controller (113) may be controlled by the MIPS processor (101) via the CPU bus (103).

In some embodiments, the memory module (115) may also include a security application program (123) which may be configured to execute automatically when the user first initiates the Wi-Fi router (100). The Wi-Fi router security application program (123) may include a unique, randomly-generated service set identifier (SSID) and encryption key. The encryption key would conform to WEP, WPA, WPA2, or other Wi-Fi compatible encryption, and would be configured during manufacturing of the Wi-Fi router (100). In some embodiments, the login password (117), the SSID, and the encryption key information may be provided as a printed, permanent label attached to the Wi-Fi router (100) during the time of manufacturing.

The touch sensitive display screen (131) may interface with the router electronics by various methods. Although there is no inherent reason why the "MIPS" processor (101) cannot also be used to power the touch sensitive display screen (131) and user interface software, often it may be convenient to devote processor (101) for the routine Wi-Fi activities, and instead off-load the task of running the display screen (131) and associated user interface software to a second processor or microcontroller (130). This second processor or microcontroller can be a dedicated or partially dedicated microprocessor that runs the display screen (131), runs user interface software, and which then connects to the rest of the modem electronics by an interface, such as a serial interface, thus somewhat mimicking the functionality of a separate computer and network connection, but as a unitized part of the router device.

Using the dedicated processor (130) and serial interface as a specific example, in one embodiment, serial communications for the Wi-Fi router (100) may be provided by a UART interface (125) and a GPIO interface (127). The Wi-Fi router (100) offloads the task of running the user interface and display screen (131) to a second processor or microcontroller. Here many processors and microcontroller types may be used. One suitable microcontroller type is the PIC family of microcontrollers, produced by Microchip Technology Inc., Chandler Ariz., and this family of microcontrollers will be used as a specific example here.

In this specific example, a PIC microcontroller (130) may, for example, comprise a PIC 16F887 chip. Here the microcontroller may communicate with the other devices through a serial communication interface configured as a full-duplex asynchronous system, or other method. The microcontroller (130) Communication between the UART interface (125), the GPIO interface (127), and the microcontroller (130) may be provided along a communication protocol (135).

The microcontroller (130) interfaces with a touch-sensitive display screen, such as an LCD touch panel (131) for enabling the user to change default security settings in the Wi-Fi router (100), as described in greater detail below. Communication between the microcontroller (130) and the LCD touch panel (131) may be provided along a microcontroller bus (133). The LCD touch panel (131) may be configured to display various types of user interfaces and instructions. For example, when data entry is required, the system software may generate a dynamic, software-driven keypad (shown in FIG. 7) to enable direct data entry by the user.

Although LCD based touch sensitive display screens or touch panels (131) are occasionally used here as a specific example, other types of touch sensitive display screens may, of course, also be used. In an alternative embodiment, a thin-film transistor (TFT) touch panel may be used comprising a touch screen component aligned over a TFT display component.

Figure 6:
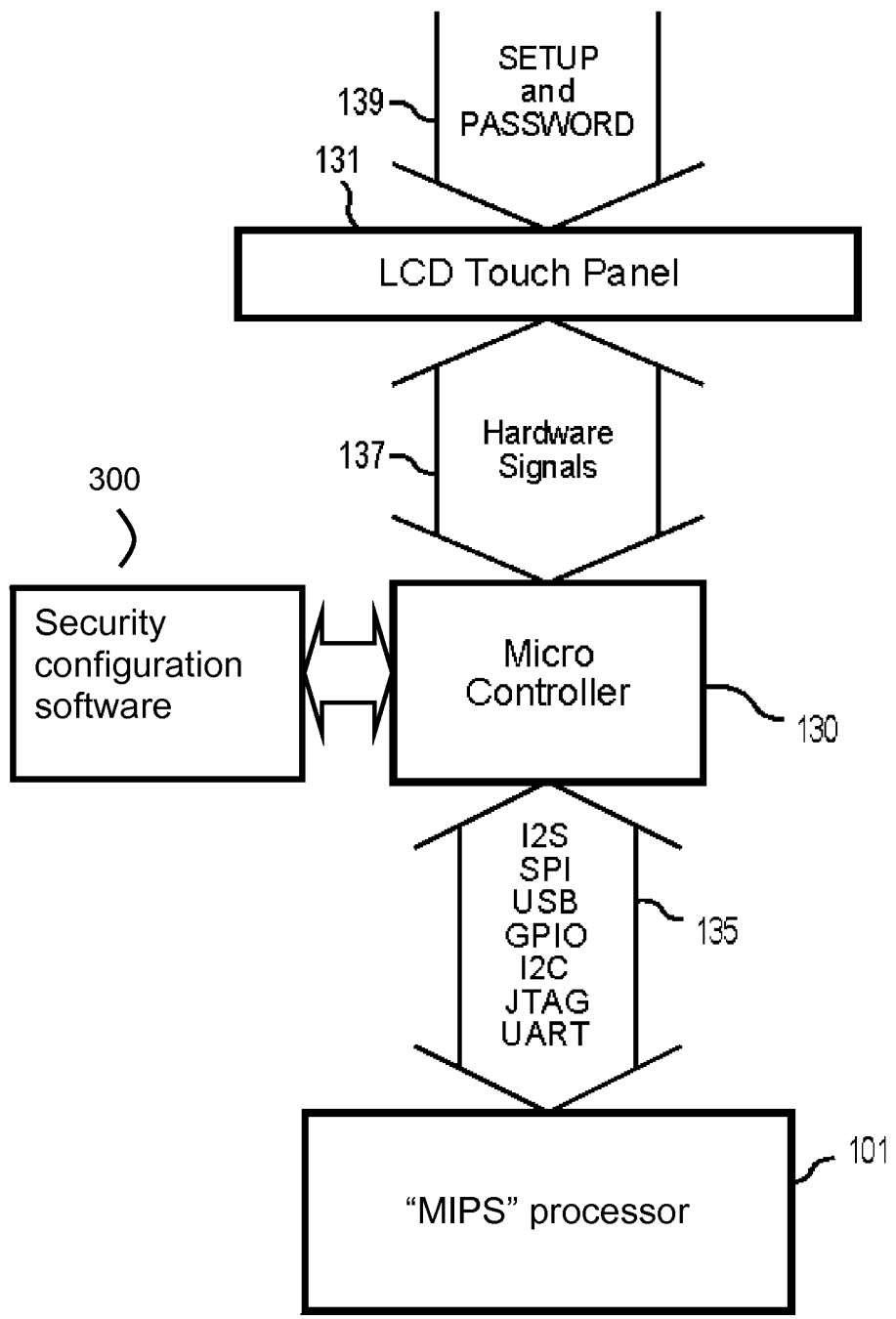
FIG. 6 is a diagrammatical illustration of the interfaces between an LCD touch panel, a microcontroller, and a processor provided in the secure Wi-Fi router of FIG. 5.

As shown in the diagram of FIG. 6, communication between the MIPS processor (101) and the microcontroller (130) may comprise a communication protocol (135) in accordance with any one or more interfaces, such as serial peripheral interface (SPI), GPIO, inter IC communication (I2C), UART, joint test action group (JTAG), inter IC sound (I2S), or other interfaces. In an exemplary embodiment, the hardware interface may use one of the above-listed communication interface standards. Communication between the microcontroller (130) and the touch sensitive display screen/LCD touch panel (131) may include hardware signals (137) to drive the display and the display drivers, as well as hardware signals to sense the feedback provided by the user at the touch surface.

Various types of security configuration software (300) may be used to drive the user interface, configure the modem's various security settings, and interact with the user though the touch sensitive display screen (131). This security configuration software directs the microcontroller (130) to send hardware signals (137) to display panel (131) with various display setup and password directions.

The user can then accept the factory default password and encryption codes by entering in the appropriate commands (139) back on the display panel (131), or alternatively change these password and encryption codes.

The security configuration software (300), working with processor or microcontroller (130) will then receive hardware signals (137) from the touch panel (131) with this user information (139), process the user data, into commands understood by the MIPS processor (101), transmitted to the MIPS processor over interface (135), and the MIPS (101) processor in turn can change the settings of the Wi-Fi router (100).

For example, assume that the user has decided that he or she wants to change the router password or encryption code, and has pressed a virtual button on the display screen (131) indicating a desire to interact with the device via a virtual keypad. In this case, security configuration software (300) working with microcontroller (130) can generate a dynamic, software driven keypad on display panel (131). This is shown in FIG. 7.

Figure 7:
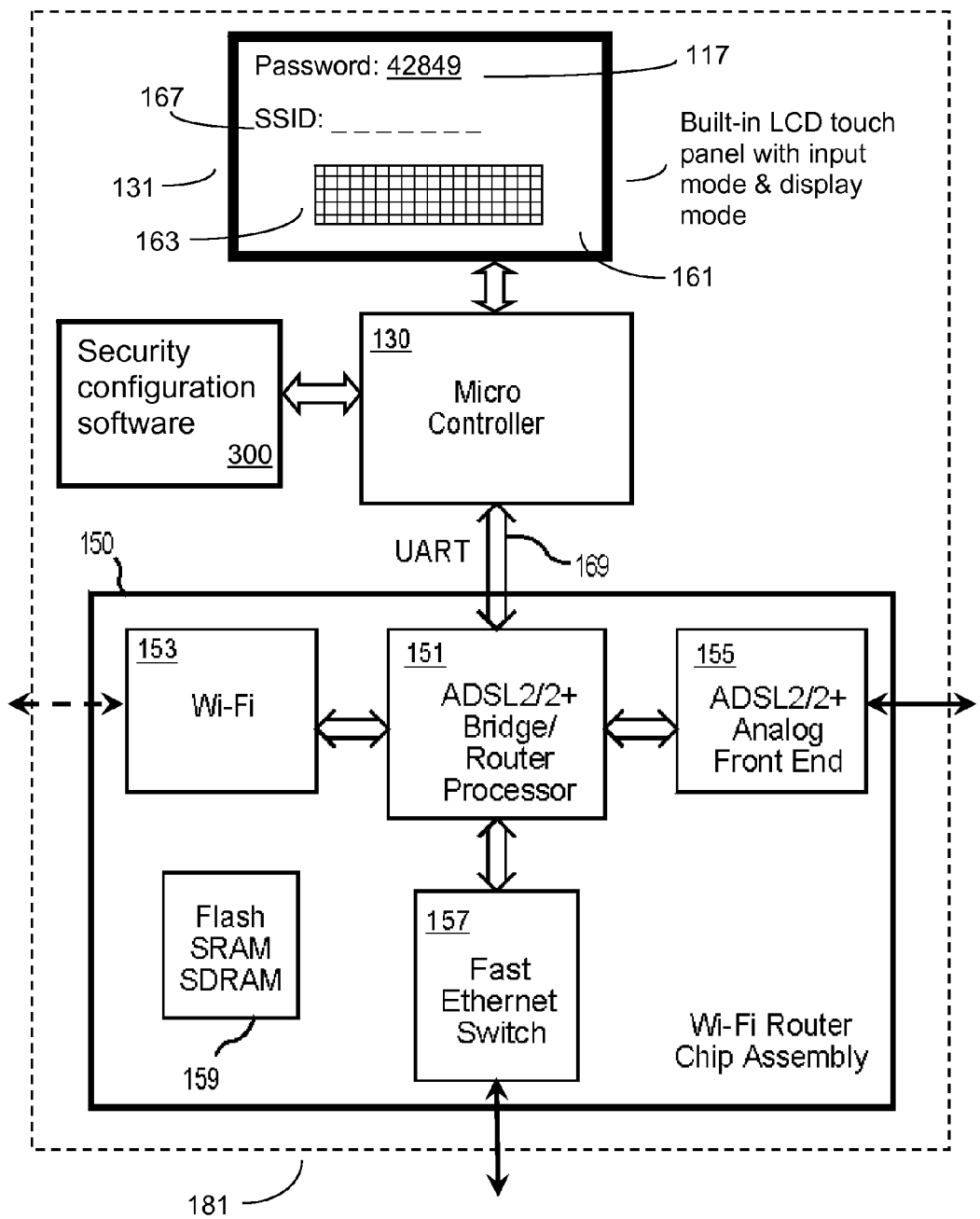
FIG. 7 is a diagrammatical illustration of an alternative embodiment of a secure Wi-Fi router, in accordance with another aspect of the present invention.

In FIG. 7, the microcontroller (130), working with security configuration software (300), may function to place the LCD touch panel (131) into an input mode or into a display mode. In the input mode, the LCD touch panel (131) provides an input screen (161) that may include one or more entry fields and or a virtual keypad (163), to enable the user to, for example, enter a randomly-generated administrative password (117) or other hard to guess password.

In the display mode, the LCD touch panel (131) may provide a display screen (161) that may provide information to the user such as, for example, an SSID (167) or an encryption key.

This information may be passed by microcontroller (130) via a link, such as a serial link to a UART or other input device to a Wi-Fi router chip assembly or circuit board (150). This chip assembly may, in turn, comprise other components such as a bridge/router processor (151) for communication with the microcontroller via an interface (169), which again may be a standard communications interface such as a I2C, SPI, I2S, USB, or other standard. In an exemplary embodiment, the bridge/router processor (151) may comprise a Ralink TC3162U chipset. The bridge/router processor (151) may further be in communication with a Wi-Fi chipset 153, such as a Rallink RT3390.

A wireless link may be provided to the bridge/router processor (151) by an analog front end (155) such as the chipset TC3086 manufactured by Ralink. The bridge/router processor (151) may also be in communication with a fast Ethernet switch (157), which may be a Ralink TC2206 chipset. Preferably, the secure Wi-Fi router chip assembly (150) also comprises a memory module (159), such as a flash memory, an SRAM memory, or an SDRAM memory. Other configurations may also be used.

Figure 8:
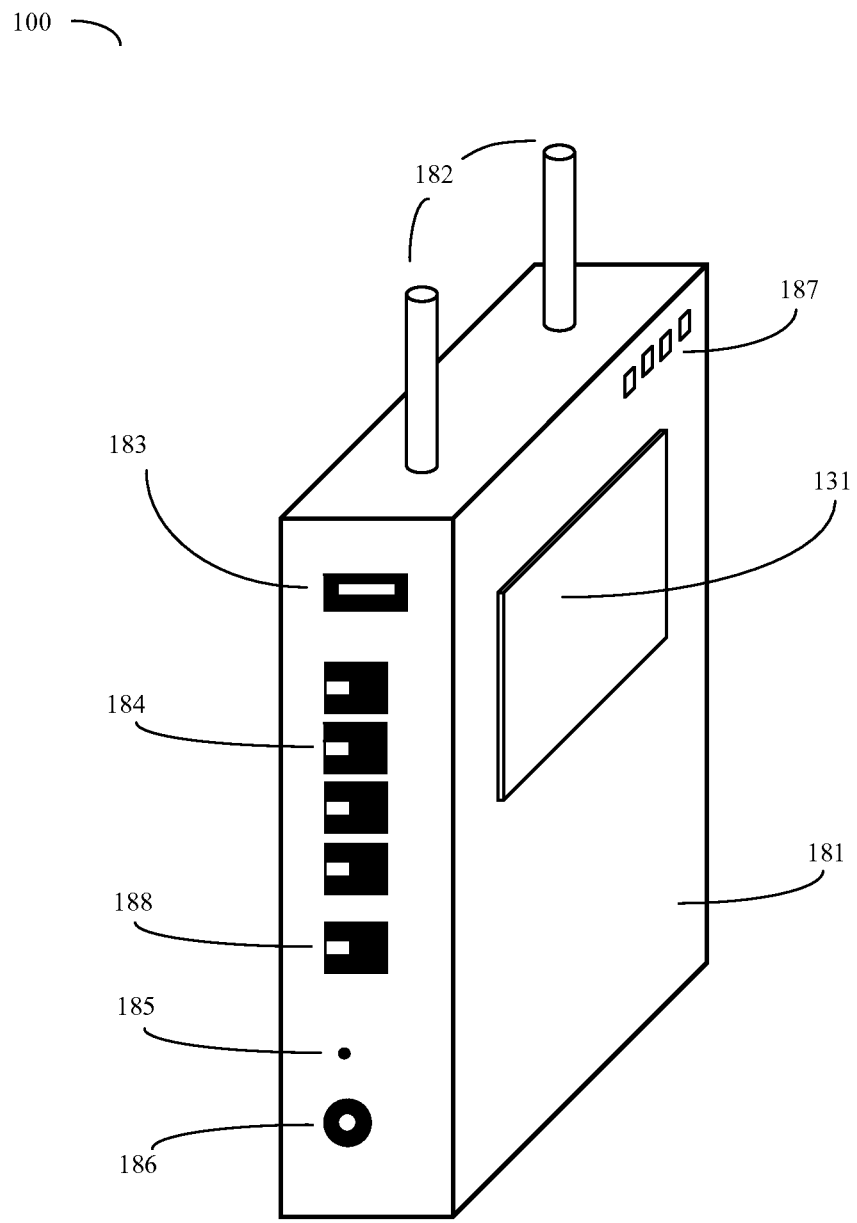
FIG. 8 is an isometric exterior view of the Wi-Fi routers of FIGS. 5 and 7, showing the router's integrated touch screen.

FIG. 8 shows a diagram showing one potential exterior appearance of the invention's Wi-Fi router with an integrated touch screen (100). As previously discussed, generally the touch screen (131) will be made an integral part of the router unit housing (181), and may, for example, be placed (secured) either on an easy to access portion of the unit, such as the side or top part of the housing (181) as shown, or alternatively may be placed in a less easy to access portion of the unit as desired. Here some other router components, such as optional exterior antennas (182), optional USB inputs or outputs (183), optional Ethernet jack inputs and outputs (184), optional reset button (185), optional power jack (186), optional LED indicators (187) and optional WAN Port(s) (188), which may typically connect to a DSL/Cable/or Fiber network outlet are also shown.

The housing (181) may be fabricated from a durable material, such as a high-density plastic, capable of withstanding normal wear and tear. In an exemplary embodiment, the Wi-Fi router assembly (100) may be provided with a Wi-Fi repeater (not shown) to extend the range of the network served by the Wi-Fi router assembly (100).

Figure 9:
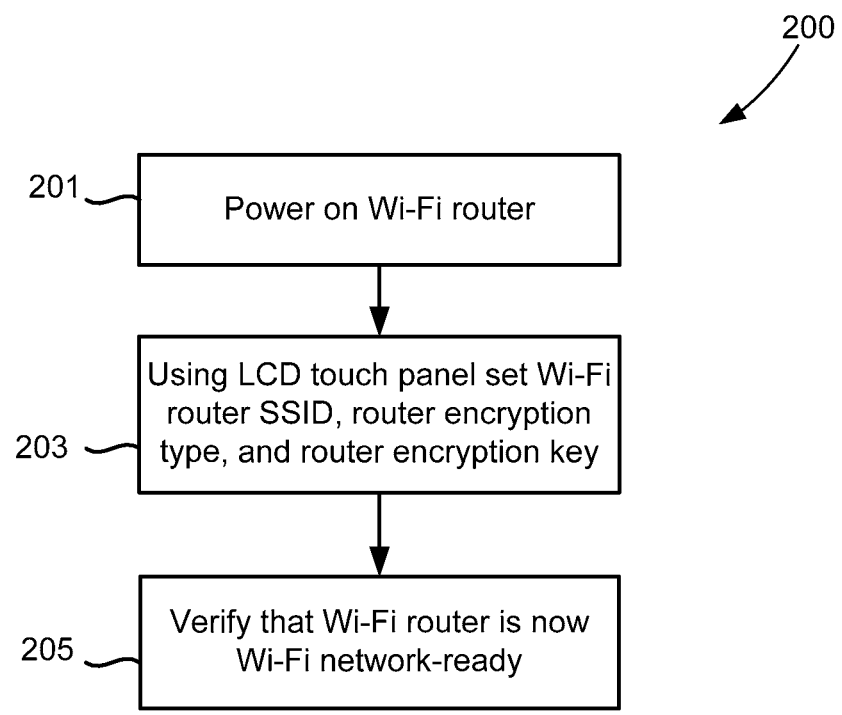
FIG. 9 is a flow diagram of the process followed by a user when initially setting up a secure Wi-Fi network with the secure Wi-Fi router of FIG. 5 or FIG. 7.

Setup and operation of the secure Wi-Fi router (100) can be explained with further reference to a flow diagram (200), shown in FIG. 9. The Wi-Fi router (100) may be powered on, at step (201), and show an initial configuration scheme (shown in FIG. 11). Using the LCD touch panel, at step (203), the user may confirm or change (set) the SSID of the Wi-Fi router (100) as well as the router encryption type and the router encryption key (shown in FIG. 11). At step (205), the user may verify that the Wi-Fi router (100) is Wi-Fi network ready. The user may optionally be notified if new users or devices are connected to the network served by the secure Wi-Fi router (100). This notification may be accomplished, for example, by a message sent to the user's cell phone via a short message service (SMS) as well-known in the art. If desired, the user can access the LCD touch panel (131) to assign short names to devices on the network, in place of identifying these devices by their corresponding MAC addresses.

Figure 10:
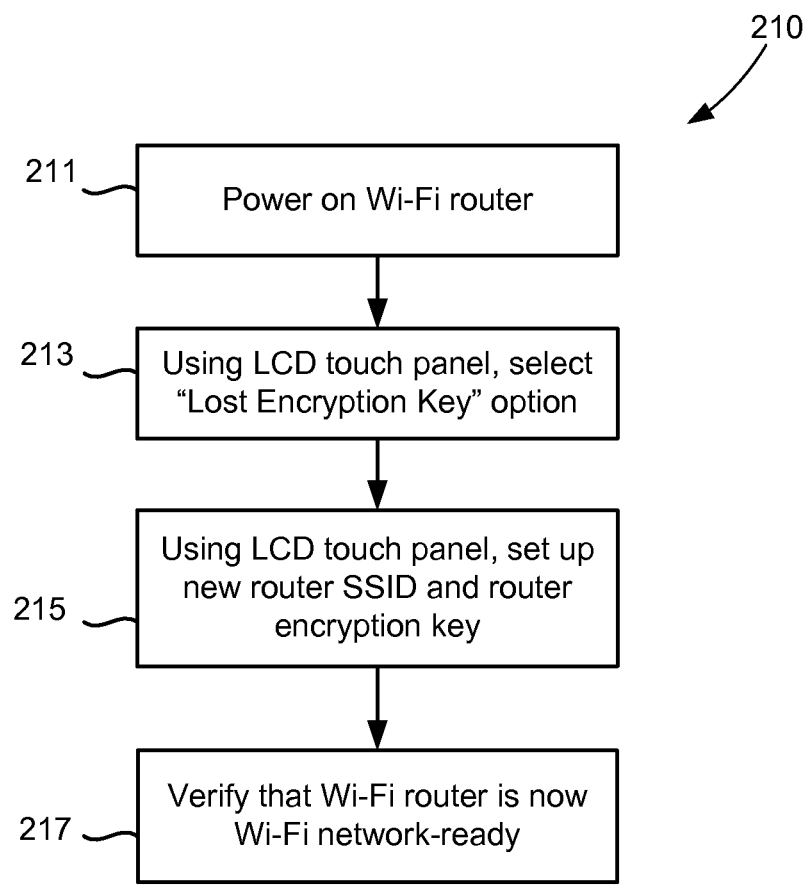
FIG. 10 is a flow diagram of the process followed by a user of the secure Wi-Fi router of FIG. 5 or FIG. 7 when re-configuring the secure Wi-Fi network.

FIG. 10 shows that if the user later needs to re-configure the Wi-Fi router (100), but has forgotten or misplaced the encryption key, the reconfiguration may be initiated by powering on the Wi-Fi router (100), at step (211). Using the LCD touch panel (131), the user may select a "lost encryption key" option, at step (213). The user may then select a "setup new SSID and new encryption key" for the router (100), at step (215). At step (217), the user verifies that the Wi-Fi router (100) is Wi-Fi network ready. If the user has simply forgotten the Wi-Fi security settings, the user may simply request the display (131) to show the settings again (optionally entering in a display access password first).

Figure 11:
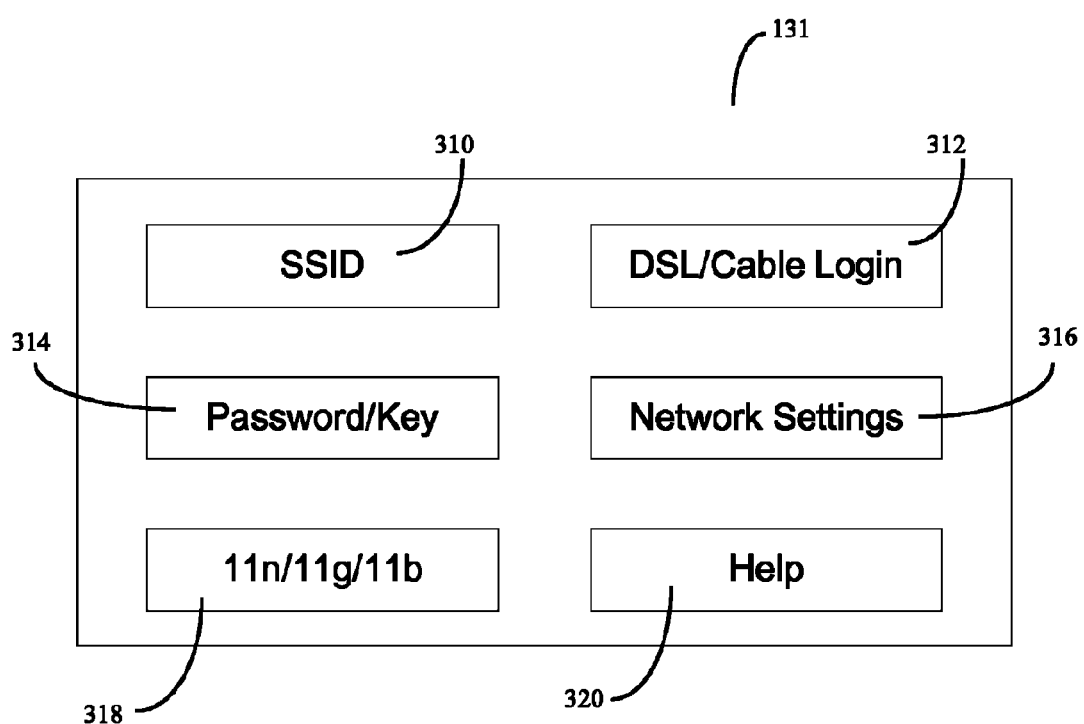
FIG. 11 shows an example of a router touch-screen display user interface.

FIG. 11 shows an example of an initial router setup user interface that might be displayed on display (131). In this example, on initial setup, the router provides the user with a variety of menu options, such as the router SSID (310), DSL/Cable Login identifier (312), the router password key (314), router network settings parameters (316), router operation mode (e.g. IEEE 802.11n, 802.11g, 802.11b setting) (318), and a help screen (320). Alternatively the initial router display may be made even simpler, and may show graphics and even animations or videos showing how the user may set up the device. Because the display (131) is a touch-sensitive display, the user need only touch on the appropriate box, icon, graphics or other portion of the display in order to set up the router.

Figure 12:
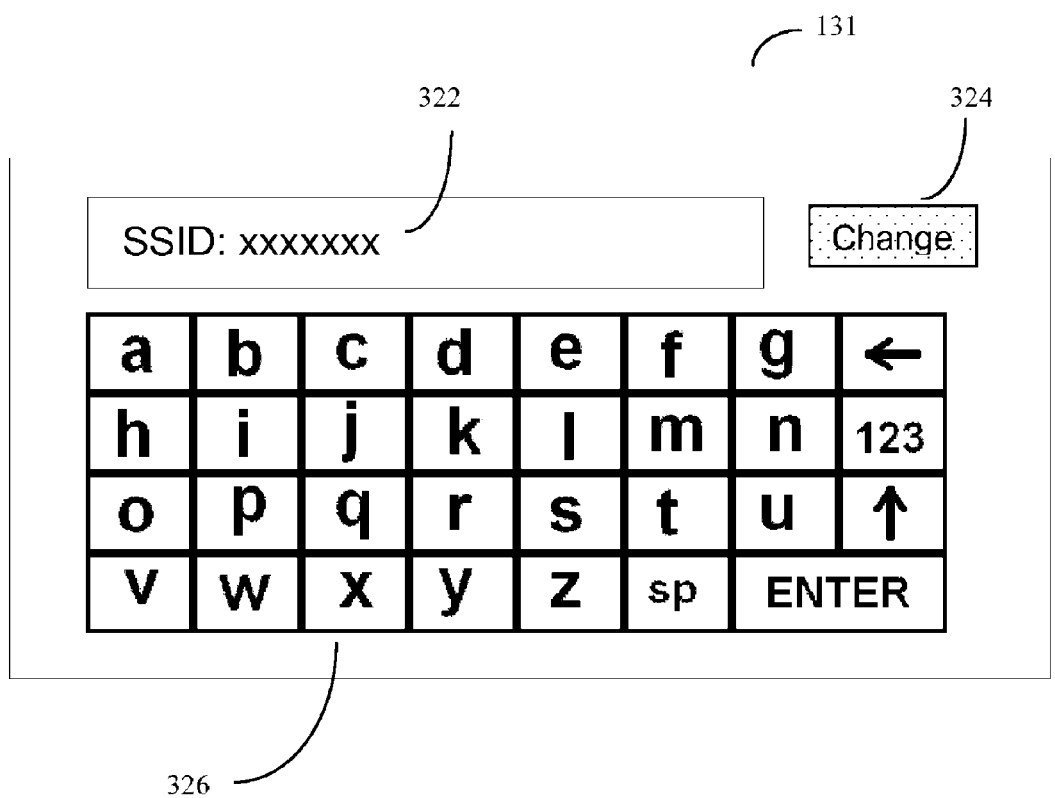
FIG. 12 shows another example of a router touch-screen display user interface

FIG. 12 shows an example of how the user may use the touch screen display (131) to set or reset the router SSID identification. Assume here that to reach this particular user interface, the user had previously touched the SSID setup box (310) using the screen previously shown in FIG. 11. Upon touching this box (310), the router is now showing FIG. 12 on display (131). In this example, the router is showing the current or default SSID number (322). The display (131) also presents the user with a "change" button (324), and is also displaying a virtual keyboard or virtual keypad (326) where the user may type and put in changes. For simplicity, the virtual keys on this virtual keyboard or virtual keypad (326) are mapped to alphabets. Alternate virtual keyboard layouts may be generated where the virtual keys are mapped to numeric or other special characters. Thus the user may enter in a new SSID identification (often as a series of alphanumeric characters) on (326) and then press the change button (324). Additionally there may be other elements, such as a return to the previous page button, home button, cancel button, as well as other graphical elements or control elements (not shown).

Many of the specific details of certain embodiments of the invention are set forth in the above description and related drawings to provide a thorough understanding of such embodiments. One skilled in the art will understand, however, that the present invention may be practiced without several of the details described in the above description. Moreover, in the description, it is understood that the figures related to the various embodiments are not to be interpreted as conveying any specific or relative physical dimension.

The invention claimed is:

1. A wireless router device, said router comprising:
at least one of a microprocessor and microcontroller;
memory;
at least one wireless transceiver;
at least one wired or optical network interface;
an integrated touch screen;
said integrated touch screen comprising part of a unitized case containing said at least one of a microprocessor and microcontroller, as well as memory and said at least one wireless transceiver;
said router having an encryption type and encryption code key, an administrator password, and a network name;
said router further configured with security configuration software; and
said security configuration software being configured to allow the administrator of said router to configure said router by direct touch or stylus input onto said integrated touch screen without the need to use a different computerized device.

2. The device of claim 1, wherein the said router confirms to IEEE 802.11 Wi-Fi standards.

3. The device of claim 1, wherein the said network name is the Wi-Fi SSID.

4. The device of claim 1, wherein said security configuration software further comprise configuration parameters, and wherein said configuration parameters comprise DSL/Cable/Fiber DSL or Cable or Fiber login and password that enable connection to the respective DSL or Cable or Fiber modem through the said wired or optical network interface.

5. The device of claim 1, wherein said router has an integrated DSL or Cable or Fiber chipset that enables the said router to connect directly to an analog wired interface of a DSL or Cable or Fiber without the need for an additional DSL or Cable or Fiber modem.

6. The device of claim 1, wherein said security configuration software is capable of generating at least one of a random passwords and Wi-Fi encryption keys upon user command.

7. The device of claim 1, wherein said security configuration software displays router setup instructions on said integrated touch screen, and receives user commands by touch input on said integrated touch screen.

8. The device of claim 1, wherein said security configuration software displays a virtual keypad or keyboard on said integrated touch screen, and receives user input which is numeric or alphabetic or alphanumeric using said virtual keypad or keyboard.

9. The device of claim 1, wherein said user input is a new password or encryption key.

10. The device of claim 1, wherein said security configuration software further comprise configuration parameters, wherein at least some of said memory comprises non-volatile memory, and wherein said configuration parameters entered using the touch screen can be permanently saved into said devices' non-volatile memory.

11. The device of claim 1, wherein said security configuration software further requests a user authorization password before displaying said router's Wi-Fi encryption code key, administrator password, or SSID network name on said integrated touch screen.

12. The device of claim 1, wherein said Wi-Fi encryption type, encryption code key, administrator password, or SSID network name are factory pre-selected to be unique to each device.

13. A wireless router device, said router comprising:
at least of a microprocessor and microcontroller;
memory;
at least one wireless transceiver;
at least one wired or optical network interface;
an integrated touch screen;
said integrated touch screen comprising part of a unitized case containing said at least one of a microprocessor and microcontroller, as well as memory and said at least one wireless transceiver;
said router having security parameters comprising an encryption type and encryption code key, an administrator password, and a network name;
at least one of said security parameters initially configured with default values that are unique to said router, thus rendering said router resistant to attack by an outside attacker;
said router further configured with security configuration software; and
said security configuration software being configured to allow the administrator of said router to configure said router by direct touch or stylus input onto said integrated touch screen without the need to use a different computerized device.

14. The device of claim 13, wherein the said router confirms to IEEE 802.11 Wi-Fi standards; and wherein said network name is the Wi-Fi SSID.

15. The device of claim 13, wherein said security configuration software is configured to display router setup instructions on said integrated touch screen, and receive user commands by touch input on said integrated touch screen.

16. The device of claim 13, wherein said security configuration software is configured to display a virtual keypad or keyboard on said integrated touch screen, and receive user input which is numeric or alphabetic or alphanumeric using said virtual keypad or keyboard.

17. The device of claim 13, wherein said security configuration software is configured to further request a user authorization password before displaying said router's Wi-Fi encryption code key, administrator password, or SSID network name on said integrated touch screen.

18. A wireless router device, said router comprising:
at least of a microprocessor and microcontroller;
memory;
at least one wireless transceiver;
at least one wired or optical network interface;
an integrated touch screen;
said integrated touch screen comprising part of a unitized case containing said at least one of a microprocessor and microcontroller, as well as memory and said at least one wireless transceiver;
said router having security parameters comprising an encryption type and encryption code key, an administrator password, and a network name;
at least one of said security parameters initially configured with default values that are unique to said router, thus rendering said router resistant to attack by an outside attacker;
said router further configured with security configuration software;
wherein said security configuration software is configured to display router setup instructions on said integrated touch screen, and receive user commands by touch input on said integrated touch screen;
said security configuration software being configured to allow the administrator of said router to configure said router by direct touch or stylus input onto said integrated touch screen without the need to use a different computerized device.

19. The device of claim 18, wherein said security configuration software is configured to display a virtual keypad or keyboard on said integrated touch screen, and receive user input which is numeric or alphabetic or alphanumeric using said virtual keypad or keyboard.

20. The device of claim 18, wherein said security configuration software is configured to further request a user authorization password before displaying said router's Wi-Fi encryption code key, administrator password, or SSID network name on said integrated touch screen.

* * * * *